(12) United States Patent
Jiroku

(10) Patent No.: US 12,438,337 B2
(45) Date of Patent: Oct. 7, 2025

(54) LIGHT EMITTING DEVICE AND PROJECTOR

(71) Applicant: Seiko Epson Corporation, Tokyo (JP)

(72) Inventor: Hiroaki Jiroku, Suwa (JP)

(73) Assignee: SEIKO EPSON CORPORATION (JP)

( * ) Notice: Subject to any disclaimer, the term of this patent is extended or adjusted under 35 U.S.C. 154(b) by 755 days.

(21) Appl. No.: 17/513,987

(22) Filed: Oct. 29, 2021

(65) Prior Publication Data

US 2022/0140568 A1 May 5, 2022

(30) Foreign Application Priority Data

Oct. 30, 2020 (JP) ................................ 2020-182873

(51) Int. Cl.
*H01S 5/042* (2006.01)
*H01S 5/00* (2006.01)
*H01S 5/323* (2006.01)

(52) U.S. Cl.
CPC .............. *H01S 5/0425* (2013.01); *H01S 5/00* (2013.01); *H01S 5/323* (2013.01)

(58) Field of Classification Search
CPC . H01S 5/11; H01S 5/18; H01S 5/0425; H01S 5/1042; H01S 5/185; H01S 5/423; H01S 5/34333; H01S 5/42
See application file for complete search history.

(56) References Cited

U.S. PATENT DOCUMENTS

2012/0164767 A1 6/2012 Gasse et al.
2020/0373731 A1 11/2020 Noda

FOREIGN PATENT DOCUMENTS

| JP | H6-244276 A | 9/1994 | |
|---|---|---|---|
| JP | 18-340156 A | 12/1996 | |
| JP | 2002-175030 A | 6/2002 | |
| JP | 2013-502715 A | 1/2013 | |
| JP | 2019029513 A | * 2/2019 | ............ G03B 21/00 |

* cited by examiner

*Primary Examiner* — Minsun O Harvey
*Assistant Examiner* — Alexander Ehrlich
(74) *Attorney, Agent, or Firm* — Harness, Dickey & Pierce, P.L.C.

(57) ABSTRACT

A light emitting device includes a substrate, and a first columnar structure group having first columnar structures at a light emitting section and first intermediate columnar structures, a second columnar structure group having second columnar structures at a region other than the light emitting section and second intermediate columnar structures, an inter-layer insulating layer covering the first and second columnar structure groups, a conductive layer coupled to the first columnar structure group via a contact hole provided in the inter-layer insulating layer, and a first electrode terminal electrically coupled to the conductive layer. Each of the first intermediate columnar structures includes a light propagation layer and a mask layer. Each of the second intermediate columnar structures includes an insulating layer and the mask layer. The conductive layer and the first electrode terminal partially overlap the second columnar structure group in a plan view.

8 Claims, 5 Drawing Sheets

FIG. 1

LIGHT EMITTING DEVICE AND PROJECTOR

The present application is based on, and claims priority from JP Application Serial Number 2020-182873, filed Oct. 30, 2020, the disclosure of which is hereby incorporated by reference herein in its entirety.

BACKGROUND

1. Technical Field

The present disclosure relates to a light emitting device and a projector.

2. Related Art

In the past, there has been known a light emitting device provided with a plurality of nanostructures having a periodic structure. In JP-A-2019-29513, there is disclosed a light emitting device provided with a light emitting section having a plurality of nanostructures which can emit light in response to injection of a current, and a transistor which is disposed in accordance with the light emitting section, and controls an amount of the current to be injected into the nanostructures. The nanostructures each have a columnar shape, and are each called, for example, a nano-column, a nano-wire, a nano-rod, or a nano-pillar.

However, in the light emitting device provided with related-art nanostructures, there is a possibility that there occurs a problem that it becomes difficult for a predetermined amount of current to flow through the light emitting region due to an influence of a leakage current, and thus, it is unachievable to obtain a predetermined amount of light emitted from the light emitting region, or unwanted light emission occurs in an area other than the light emitting region.

SUMMARY

In view of the problems described above, a light emitting device according to an aspect of the present disclosure includes a substrate, and a columnar structure group formed of a plurality of columnar structures disposed on the substrate, wherein the plurality of columnar structures includes a plurality of first columnar structures disposed in a light emitting section, and a plurality of second columnar structures disposed in a region other than the light emitting section on the substrate, the columnar structure group includes a first columnar structure group including the plurality of first columnar structures, and a light propagation layer disposed between the first columnar structures, and a second columnar structure group including the plurality of second columnar structures, and an insulating layer disposed between the second columnar structures, an inter-layer insulating layer which is configured to cover the first columnar structure group and the second columnar structure group is disposed on the substrate, a conductive layer to be electrically coupled to the first columnar structure group via a contact hole provided to the inter-layer insulating layer is disposed on the inter-layer insulating layer, a first electrode terminal electrically coupled to the conductive layer is disposed on the inter-layer insulating layer, the first columnar structures are formed of a first semiconductor layer having a first conductivity type disposed on the substrate, a second semiconductor layer having a second conductivity type different from the first conductivity type, and a light emitting layer disposed between the first semiconductor layer and the second semiconductor layer, the conductive layer is electrically coupled to the second semiconductor layer, and when viewed from a normal direction of the substrate, the conductive layer and the first electrode terminal overlap the second columnar structure group.

Further, a projector according to another aspect of the present disclosure includes the light emitting device according to the aspect of the present disclosure, and a projection optical device configured to project the light emitted from the light emitting device.

DESCRIPTION OF EXEMPLARY EMBODIMENTS

First Embodiment

A first embodiment of the present disclosure will hereinafter be described using FIG. 1 through FIG. 4.

In the present embodiment, there is shown an example of a light emitting device provided with a plurality of columnar structures (nano-columns).

Figure 1:
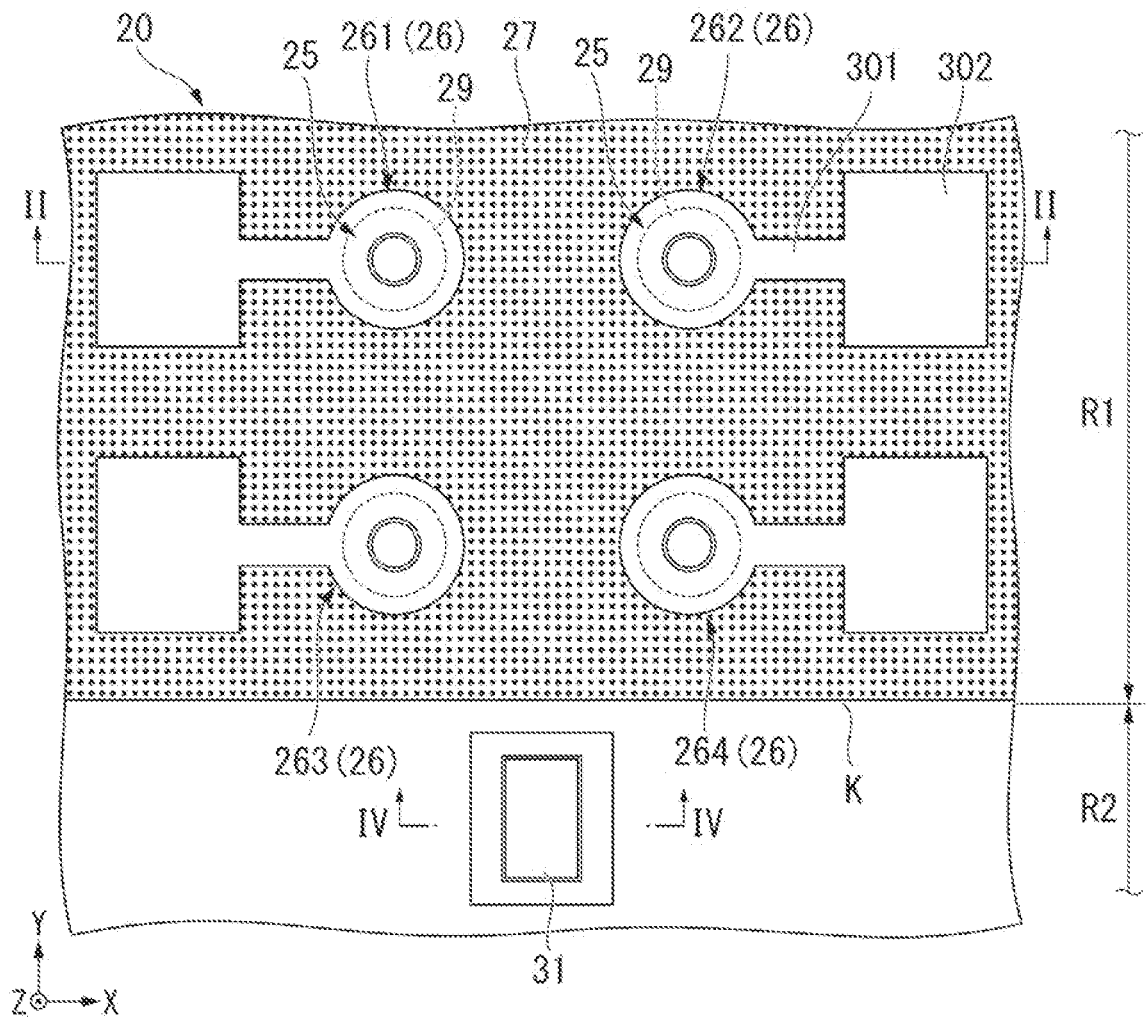
FIG. 1 is a plan view of a light emitting device according to a first embodiment.
Figure 2:
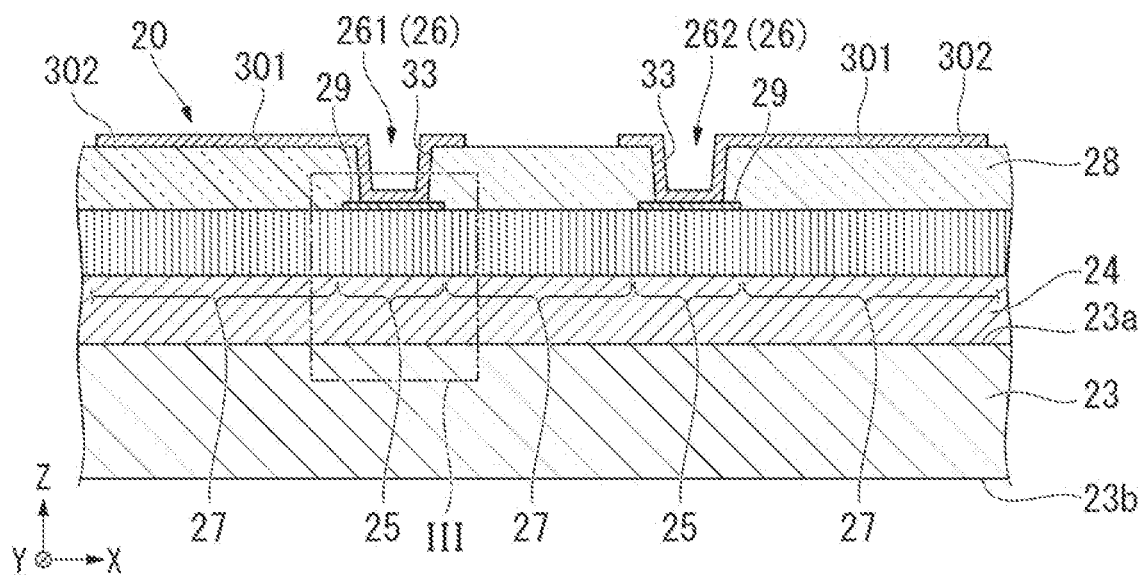
FIG. 2 is a cross-sectional view of the light emitting device along the line II-II shown in FIG. 1.
Figure 3:
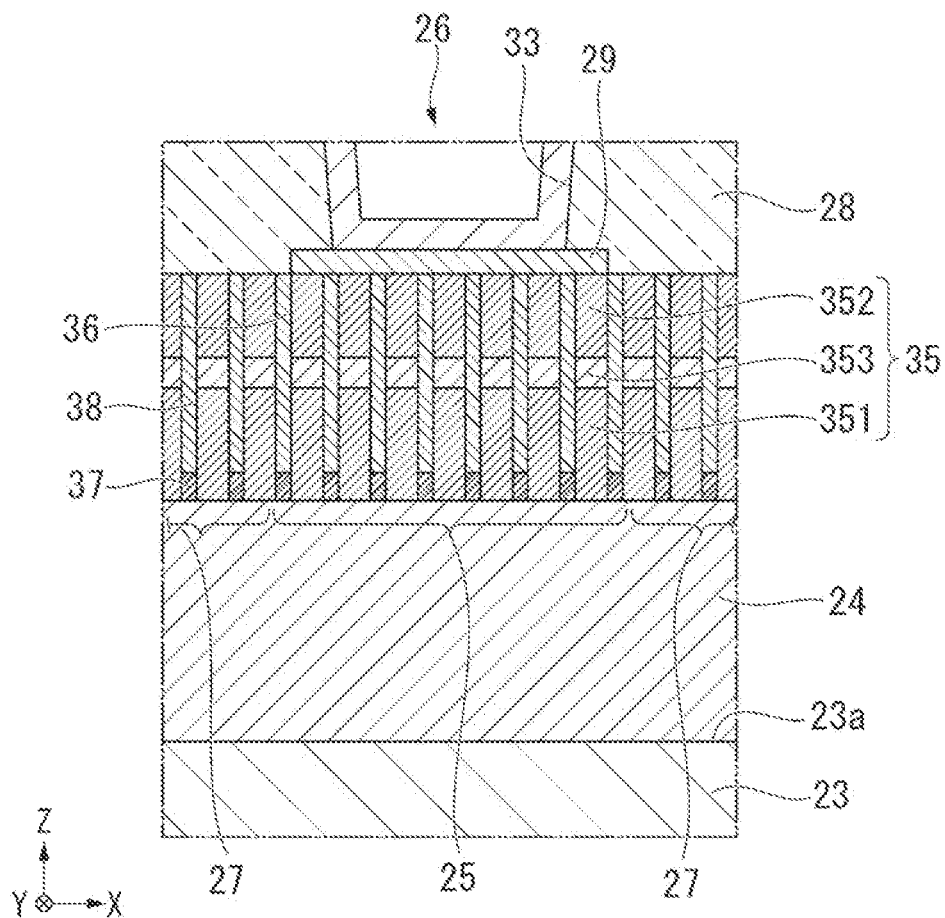
FIG. 3 is an enlarged cross-sectional view of a portion indicated by the reference symbol III shown in FIG. 2.
Figure 4:
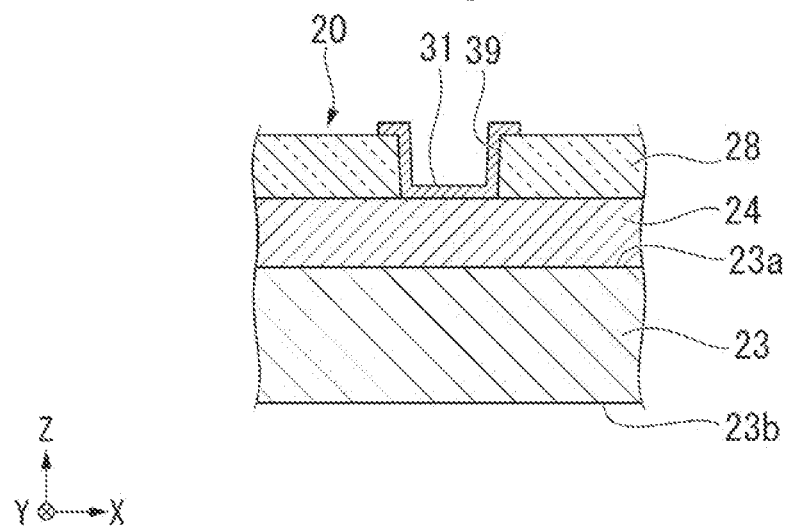
FIG. 4 is a cross-sectional view of the light emitting device along the line IV-IV shown in FIG. 1.

FIG. 1 is a plan view of a light emitting device 20 according to the present embodiment. FIG. 2 is a cross-sectional view of the light emitting device 20 along the line II-II shown in FIG. 1. FIG. 3 is an enlarged cross-sectional view of a portion indicated by the reference symbol III shown in FIG. 2. FIG. 4 is a cross-sectional view of the light emitting device 20 along the line IV-IV shown in FIG. 1.

It should be noted that in each of the drawings described below, the constituents are shown with the scale ratios of respective sizes set differently between the constituents in some cases in order to make each of the constituents eye-friendly.

As shown in FIG. 1 through FIG. 4, the light emitting device 20 according to the present embodiment is provided with a substrate 23, a semiconductor layer 24, light emitting sections 26 each having a first columnar structure group 25, a second columnar structure group 27, an inter-layer insulating layer 28, first electrodes 29, first interconnections 301, first electrode terminals 302, and a second electrode terminal 31. In other words, the light emitting device 20 is provided with the substrate 23 and the columnar structure groups 25, 27 each formed of a plurality of columnar structures disposed on the substrate 23.

As shown in FIG. 2, the substrate 23 has a first surface 23a, and a second surface 23b different from the first surface 23a. The substrate 23 is formed of a base material such as a sapphire substrate, a silicon (Si) substrate, or a gallium nitride (GaN) substrate. Further, the substrate 23 can be formed of a composite substrate made of a stacked body of the base material described above and a printed board.

In each of the drawings, a direction of connecting the first surface 23a and the second surface 23b of the substrate 23 to each other, namely a normal direction of the substrate 23, is defined as a Z-axis direction, a direction in which a first light emitting section 261 and a second light emitting section 262 described later are arranged viewed from the Z-axis direction is defined as an X-axis direction, and a direction perpendicular to the Z-axis direction and the X-axis direction is defined as a Y-axis direction.

The semiconductor layer 24 is disposed on the first surface 23a of the substrate 23. The semiconductor layer 24 is formed of, for example, n-type GaN made of silicon-doped GaN. The semiconductor layer 24 functions as a conductive layer for supplying an electrical current to a first semiconductor layer 351 of a columnar structure 35 described later.

The light emitting sections 26 are disposed on the first surface 23a of the substrate 23 via the semiconductor layer 24. As shown in FIG. 1, the light emitting sections 26 in the present embodiment include the first light emitting section 261, the second light emitting section 262 disposed at a position at a distance along the X-axis direction from the first light emitting section 261 on the substrate 23, a third light emitting section 263 disposed at a position at a distance along the Y-axis direction from the first light emitting section 261 on the substrate 23, and a fourth light emitting section 264 disposed at a position at a distance along the Y-axis direction from the second light emitting section 262 on the substrate 23. It should be noted that although the four light emitting sections 26 arranged in an array along the X-axis direction and the Y-axis direction are shown in FIG. 1, the number of the light emitting sections 26 is not particularly limited.

The light emitting sections 26 each have the first columnar structure group 25 including a plurality of columnar structures 35 and a light propagation layer 36 described later. The light emitting section 26 is a region where the current is injected into the plurality of columnar structures 35 from the outside to thereby emit light. The light emitting sections are each constituted by the first electrode 29, the semiconductor layer 24, and the first columnar structure group sandwiched between the first electrode 29 and the semiconductor layer 24. The detailed configuration of the light emitting sections 26 will be described later. The columnar structure 35 in the first columnar structure group 25 in the present embodiment corresponds to a first columnar structure in the appended claims.

The second columnar structure group 27 is disposed in a region other than the light emitting sections 26 on the first surface 23a of the substrate 23. The second columnar structure group 27 is configured including the plurality of columnar structures 35 and an insulator. The detailed configuration of the second columnar structure group 27 will be described later.

The inter-layer insulating layer 28 is disposed so as to cover the first columnar structure groups 25 and the second columnar structure group 27 on the first surface 23a of the substrate 23. The inter-layer insulating layer 28 is formed of an insulating material such as a silicon oxide layer or a silicon nitride layer.

The first electrodes 29 are disposed at positions corresponding respectively to the light emitting sections 26 on the inter-layer insulating layer 28 on the first surface 23a of the substrate 23. The first electrodes 29 are each formed of, for example, an indium tin oxide (ITO) layer. The first electrode 29 makes contact with the first columnar structure group 25 to thereby be electrically coupled to the first columnar structure group 25, and injects the current to a second semiconductor layer 352 of each of the columnar structures 35 described later.

The first interconnections are disposed on the inter-layer insulating layer 28 in the first surface 23a of the substrate 23. The first interconnections 301 are electrically coupled to the first electrodes 29 via contact holes 33 provided to the inter-layer insulating layer 28, and are electrically coupled to the first columnar structure groups 25 via the first electrodes 29, respectively. Thus, the first electrode 29 and the first interconnection 301 are electrically coupled to the second semiconductor layer 352 of each of the columnar structures 35 described later. The first interconnections 301 are each formed of an electrically-conductive material such as ITO similarly to the first electrodes 29, copper (Cu), or aluminum (Al).

The first electrode terminals 302 are disposed on the inter-layer insulating layer 28, and are electrically coupled to the first electrodes 29 and the first interconnections 301, respectively. In the present embodiment, the first electrode terminals 302 are formed integrally with the first interconnections 301, respectively. Therefore, the first electrode terminals 302 are formed of the electrically-conductive material such as ITO, Cu, or Al.

The light generated in a light emitting layer 353 of the columnar structure 35 is transmitted through the first electrode 29 and the first interconnection 301, and is then emitted. It should be noted that although the first electrodes 29 and the first interconnections 301 are formed of respective layers in the present embodiment, it is possible for the first electrodes 29 and the first interconnections 301 to be formed of an integrated single layer, namely a first conductive layer. The first electrode 29 and the first interconnection 301 in the present embodiment correspond to a conductive layer in the appended claims.

As shown in FIG. 3, the light emitting sections 26 each have the first columnar structure group 25 including the plurality of columnar structures 35 and the light propagation layer 36. The plurality of columnar structures 35 is disposed on the first surface 23a of the substrate 23 via the semiconductor layer 24. Although the illustration will be omitted, a shape (planer shape) of the columnar structure 35 viewed from the Z-axis direction is not particularly limited, and can be, for example, a circular shape or an elliptical shape, or can also be a polygonal shape. A diametrical size of the columnar structure 35, for example, a diameter of an inscribed circle when the planar shape of the columnar structure 35 is a polygonal shape, is in a nanometer-order range smaller than 1 μm, and is specifically, for example, no smaller than 10 nm and no larger than 500 nm. A size in the Z-axis direction of the columnar structure 35, namely a so-called height of the columnar structure 35, is, for example, no smaller than 0.1 μm and no larger than 5 μm. The plurality of columnar structures 35 is disposed at a distance from each other. An interval between the columnar structures 35 adjacent to each other is, for example, no smaller than 1 nm and no larger than 500 nm.

The plurality of columnar structures 35 is arranged at a predetermined pitch in a predetermined direction in a plan view viewed from the Z-axis direction. According to such a periodic structure, a light confinement effect can be obtained at a photonic band-edge wavelength A decided by the pitch and the diameter of the plurality of columnar structures 35 and refractive indexes of respective parts. In the light emitting device 20, since the wavelength band of the light generated in the light emitting layer 353 of the columnar structure 35 includes the photonic band-edge wavelength A, it is possible to develop an effect of a photonic crystal. In the example shown in FIG. 3, the plurality of columnar structures 35 is disposed so as to be arranged side by side in the X-axis direction and the Y-axis direction. It should be noted that it is possible for the plurality of columnar structures 35 to be arranged in a direction tilted from the X-axis direction and the Y-axis direction.

The columnar structures 35 are each formed of the first semiconductor layer 351 having a first conductivity type, the second semiconductor layer 352 having a second conductivity type different from the first conductivity type, and the light emitting layer 353 disposed between the first semiconductor layer 351 and the second semiconductor layer 352. In other words, the columnar structure 35 is formed of a stacked body having the first semiconductor layer 351, the light emitting layer 353, and the second semiconductor layer 352 stacked in this order from the semiconductor layer 24 side.

Specifically, the first semiconductor layer 351 is formed of, for example, an n-type GaN layer made of silicon-doped GaN. The light emitting layer 353 is formed of a semiconductor material capable of emitting light in response to injection of an electrical current, and has a quantum well structure in which, for example, a plurality of GaN layers and a plurality of InGaN layers are alternately stacked on one another. The number of the GaN layers and the number of the InGaN layers constituting the light emitting layer 353 are not particularly limited. The second semiconductor layer 352 is formed of, for example, a p-type GaN layer made of Mg-doped GaN. The first semiconductor layer 351 and the second semiconductor layer 352 function as cladding layers for confining the light in the light emitting layer 353.

In the light emitting device 20, the p-type second semiconductor layer 352, the light emitting layer 353 with no impurity doped, and the n-type first semiconductor layer 351 constitute a pin diode. The first semiconductor layer 351 and the second semiconductor layer 352 are larger in bandgap than the light emitting layer 353. Therefore, when injecting a current between the first electrode 29 and the semiconductor layer 24 in a direction in which the forward bias voltage of the pin diode is applied, recombination between electrons and holes occurs in the light emitting layer 353 to cause light emission. The light generated in the light emitting layer 353 is confined in the Z-axis direction by the first semiconductor layer 351 and the second semiconductor layer 352, and then propagates in an X-Y plane direction perpendicular to the Z-axis direction. The light propagating in the X-Y plane direction forms a standing wave, and causes a laser oscillation with a gain in the light emitting layer 353. On this occasion, the light emitting device 20 emits positive first-order diffracted light and negative first-order diffracted light as a laser beam in the Z-axis direction, namely toward the first electrode 29 and the substrate 23.

In the light emitting device 20, the refractive indexes and the thicknesses of the first semiconductor layer 351, the second semiconductor layer 352, and the light emitting layer 353 are designed so that the intensity of the light propagating in the X-Y plane direction becomes the highest in the Z-axis direction in the light emitting layer 353. It should be noted that although not shown in the drawings, it is also possible to dispose a reflecting layer between the substrate 23 and the semiconductor layer 24, or on the second surface 23b of the substrate 23. The reflecting layer is formed of, for example, a DBR (Distributed Bragg Reflector) layer. When the reflecting layer is disposed, it is possible to reflect the light generated in the light emitting layer 353 with the reflecting layer, and it is possible to emit the light only from the first electrode 29 side.

In the present embodiment, a mask layer 37 made of an insulating material is disposed on the semiconductor layer 24. The mask layer 37 is disposed between the light propagation layer 36 and the semiconductor layer 24. The mask layer 37 functions as a mask for selectively depositing a variety of types of semiconductor films in a predetermined region on the semiconductor layer 24 to form the columnar structures 35.

The light propagation layer 36 is disposed on an upper layer of the mask layer 37 between the columnar structures 35 adjacent to each other. In the plan view viewed from the Z-axis direction, the light propagation layer 36 is disposed so as to surround each of the columnar structures 35. The refractive index of the light propagation layer 36 is lower than the refractive index of the light emitting layer 353. In the case of the present embodiment, the light propagation layer 36 is formed of an insulating material such as a silicon oxide layer, an aluminum oxide layer, or a titanium oxide layer. The light propagation layer 36 propagates the light generated in the light emitting layer 353 of each of the columnar structures 35 toward the X-Y plane direction. Further, the light propagation layer 36 can be air or a vacuum.

The second columnar structure group 27 has the plurality of columnar structures 35 and the insulator 38. In the case of the present embodiment, the configuration of the second columnar structure group 27 is the same as the configuration of the first columnar structure groups 25 each constituting the light emitting section 26 shown in FIG. 3. In other words, the configuration of the columnar structure 35 of the second columnar structure group 27 is the same as the configuration of the columnar structure 35 of the first columnar structure groups 25. Therefore, the columnar structure 35 of the second columnar structure group 27 is formed of the stacked body having the first semiconductor layer 351, the light emitting layer 353, and the second semiconductor layer 352 stacked in this order from the semiconductor layer 24 side. The columnar structure 35 in the second columnar structure group 27 in the present embodiment corresponds to a second columnar structure in the appended claims.

It should be noted that since the first electrode 29 does not exist above the second columnar structure group 27, the current is not injected in the second columnar structure group 27, and the light emission never occurs. In the case of the present embodiment, the distance between the columnar structures 35 adjacent to each other in the second columnar structure group 27 and the distance between the columnar structures 35 adjacent to each other in the first columnar structure groups 25 are equal to each other. The size of the columnar structure 35 of the second columnar structure group and the size of the columnar structure 35 of the first columnar structure groups 25 are equal to each other. Further, the insulator 38 is formed of the same insulating material as that of the light propagation layer 36. The insulator 38 is formed of an insulating material such as a silicon oxide layer or a silicon nitride layer. Further, the insulator 38 can be air, or can also be a vacuum. The insulator 38 in the present embodiment corresponds to an insulating layer in the appended claims.

As shown in FIG. 4, the second electrode terminal 31 is disposed on the inter-layer insulating layer 28 in the first surface 23a of the substrate 23. The second electrode terminal 31 makes contact with the semiconductor layer 24 via a contact hole 39 provided to the inter-layer insulating layer 28, and is electrically coupled to the semiconductor layer 24. Thus, the second electrode terminal 31 is electrically coupled to the first semiconductor layer 351 in each of the columnar structures 35 via the semiconductor layer 24. The second electrode terminal 31 is formed of an electrically-conductive material such as ITO, copper (Cu), or aluminum (Al) similarly to the first interconnections 301.

The second electrode terminal 31 in the present embodiment corresponds to a second conductive layer in the appended claims.

As shown in FIG. 1, in the case of the present embodiment, the plurality of light emitting sections 26 is arranged at a distance in the X-axis direction and the Y-axis direction from each other. Further, the width in the Y-axis direction of the first electrode terminal 302 is broader than the width in the Y-axis direction of the first interconnection 301. In a region located between the first light emitting section 261 and the second light emitting section 262 on the substrate 23 viewed from the Z-axis direction, there is disposed the second columnar structure group 27. Further, the second columnar structure group 27 is also disposed in a region located between the third light emitting section 263 and the fourth light emitting section 264, a region located between the first light emitting section 261 and the third light emitting section 263, and a region located between the second light emitting section 262 and the fourth light emitting section 264. In other words, the second columnar structure group 27 is disposed in a region other than the plurality of light emitting sections 26 on the substrate 23.

In FIG. 1, the regions where the first columnar structure group 25 or the second columnar structure group 27 is disposed are hatched with dots. In the plan view viewed from the Z-axis direction, the first electrode 29, the first interconnection 301, and the first electrode terminal 302 overlap the first columnar structure group 25 or the second columnar structure group 27. In contrast, the second electrode terminal 31 fails to overlap the first columnar structure group 25 or the second columnar structure group 27.

Specifically, the second electrode terminal 31 is disposed at a position at a distance in the Y-axis direction from the region where the plurality of light emitting sections 26 are disposed. A boundary K between the region R1 where the first columnar structure groups 25 and the second columnar structure group 27 are disposed and the region R2 where neither the first columnar structure group 25 nor the second columnar structure group 27 is disposed extends along the X-axis direction between the plurality of light emitting sections 26 and the second electrode terminal 31. In other words, as shown in FIG. 2, in the region where the plurality of light emitting sections 26 is disposed, there exists the first columnar structure group 25 or the second columnar structure group 27 below the first electrodes 29, the first interconnections 301, or the first electrode terminals 302, but as shown in FIG. 4, in the region where the second electrode terminal 31 is disposed, neither the first columnar structure group 25 nor the second columnar structure group 27 exists below the second electrode terminal 31.

In the case of the present embodiment, although the names are discriminated from each other as the first columnar structure group 25 and the second columnar structure group 27 for the sake of convenience of explanation, the configuration of the first columnar structure group 25 and the configuration of the second columnar structure group 27 are the same as each other as described above. Therefore, when manufacturing the light emitting device 20, first, the semiconductor layer 24 is deposited on the first surface 23a of the substrate 23, and then, the plurality of columnar structures 35 is formed throughout the entire surface of the semiconductor layer 24. Subsequently, the plurality of columnar structures 35 located in the formation region of the second electrode terminal 31 is removed by etching. Alternatively, it is possible to form a mask in the formation region of the second electrode terminal on the substrate 23, and then, selectively form the plurality of columnar structures 35 in the predetermined region. It is possible to manufacture the light emitting device 20 according to the present embodiment using this kind of method.

Further, although the illustration will be omitted, the light emitting device 20 according to the present embodiment has a configuration in which the first electrode terminals 302 and the second electrode terminal 31 are electrically coupled to an external wiring board with bonding wires or the like to thereby supply each of the light emitting sections 26 with an electrical current. In other words, the first electrode terminals 302 and the second electrode terminal 31 are each an electrode pad for forming a bonding wire, a bump, or the like, and the light emitting device 20 is electrically coupled to the external wiring board via the bonding wires, bumps, or the like. It should be noted that the light emitting device 20 can be provided with a transistor for controlling lighting and extinction of the light emitting section 26 for each of the light emitting sections 26 on the substrate 23.

Here, a related-art light emitting device will be described.

Figure 9:
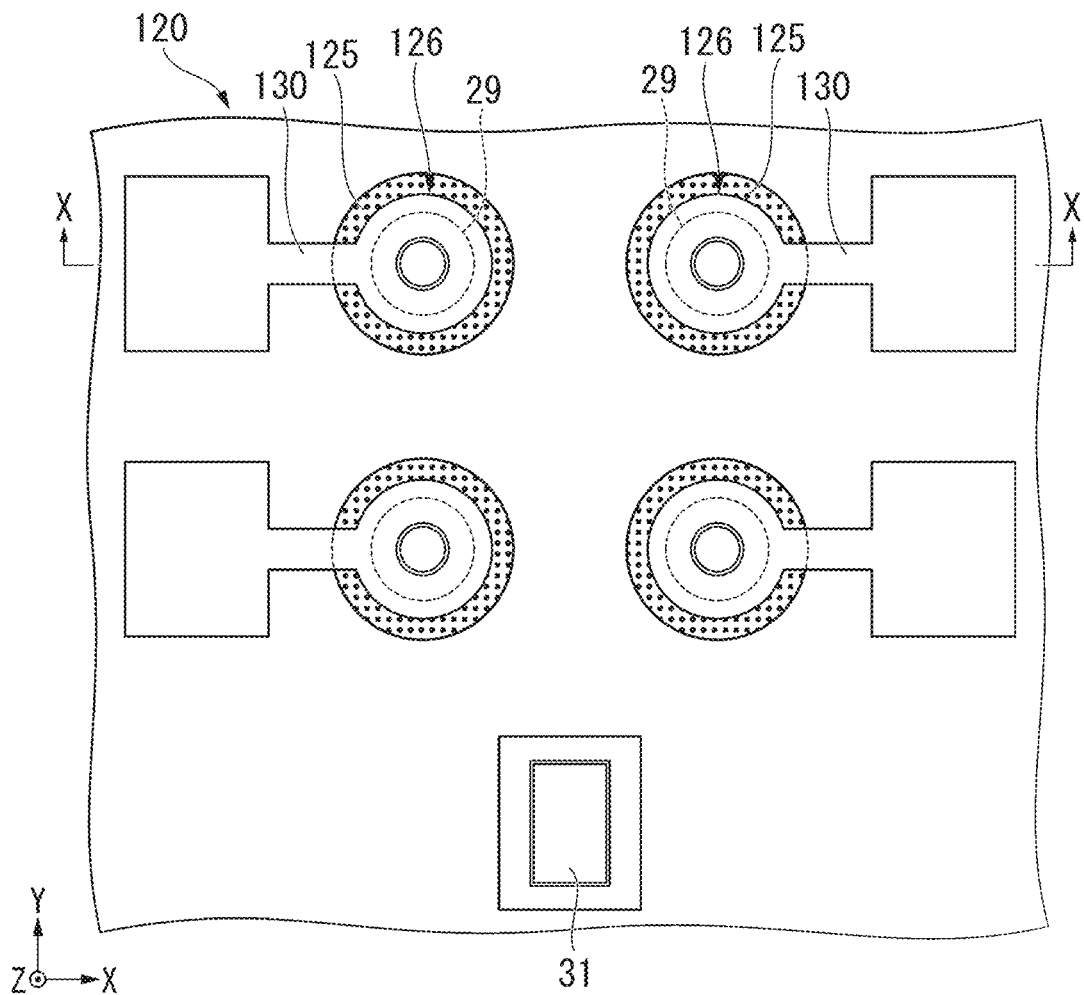
FIG. 9 is a plan view of a light emitting device according to a relate-art example.
Figure 10:
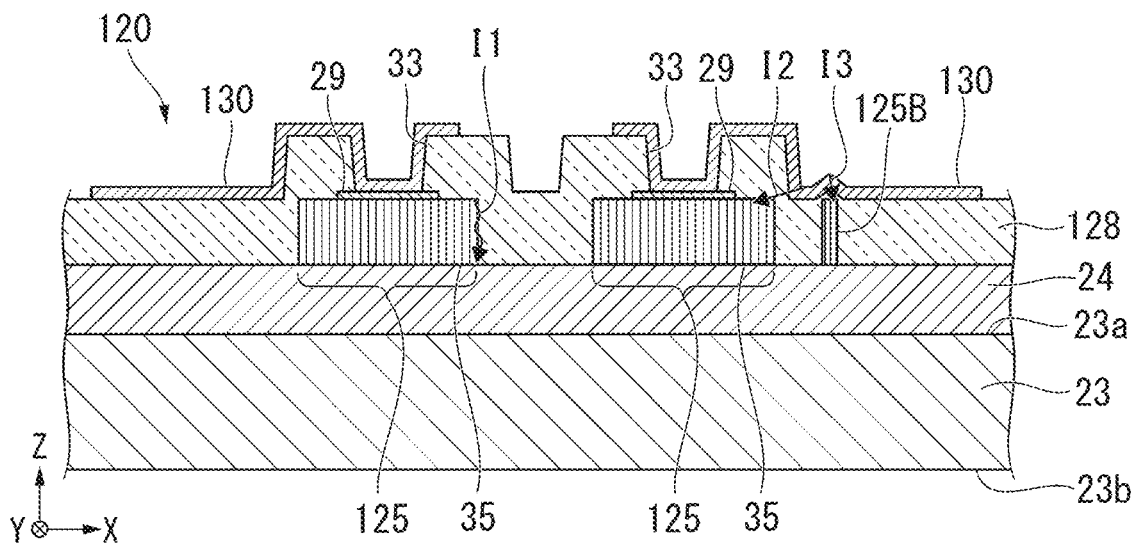
FIG. 10 is a cross-sectional view of the light emitting device along the line X-X shown in FIG. 9.

FIG. 9 is a plan view of the related-art light emitting device 120. FIG. 10 is a cross-sectional view of the related-art light emitting device 120 along the line X-X shown in FIG. 9. In FIG. 9 and FIG. 10, the constituents common to those shown in FIG. 1 and FIG. 2 are denoted by the same reference symbols.

As shown in FIG. 9, in the related-art light emitting device 120, a columnar structure group 125 is disposed only in a region where a light emitting section 126 is disposed, but is not disposed in a region other than the light emitting section 126, namely a region located between the two light emitting sections 126 adjacent to each other. In other words, the columnar structure groups 125 are disposed isolated from each other in the respective light emitting sections 126. Therefore, when manufacturing the light emitting device 120, the plurality of columnar structures 35 is formed throughout the entire surface on the semiconductor layer 24, and then the etching for patterning the plurality of columnar structures 35 in the respective light emitting sections 126 is performed. Alternatively, a mask provided with opening parts corresponding to the positions of the light emitting sections 126 is formed on the semiconductor layer 24, and then, the plurality of columnar structures 35 is selectively formed at the positions of the light emitting sections 126.

On this occasion, damage such as a crystal defect occurs due to the etching in the columnar structure 35 located at an end portion of the columnar structure group 125 in some cases. When the damage occurs in the end portion of the columnar structure group 125, as shown in FIG. 10, a leakage current I1 becomes apt to flow between the first electrode 29 and the semiconductor layer 24 using the damage portion as a path. Further, even when selectively forming the plurality of columnar structures 35 without using etching, the composition and the shape of the semiconductor layer constituting the columnar structure 35 are disturbed in the end portion of the columnar structure group 125 compared to a central portion of the columnar structure group 125, and therefore, the leakage current I1 becomes apt to flow.

Further, as shown in FIG. 10, in the related-art light emitting device 120, a step occurs between the region where the columnar structure group 125 is disposed and the region where the columnar structure group 125 is not disposed, and therefore, a step also occurs in an inter-layer insulating layer 128 which covers the columnar structure group 125 reflecting that step. In this case, the inter-layer insulating layer 128 in the step portion is apt to decrease in film thickness compared to other portions, and is apt to cause damage such as a crack due to a stress. On the grounds described above, a leakage current I2 becomes apt to flow between a first interconnection 130 and the columnar structure 35. Further, in some cases, there is a possibility that broken line occurs in the first interconnection 130.

Further, as shown in FIG. 10, an etching residue 125B of the columnar structure group 125 occurs on the substrate 23 in some cases. In this case, it is difficult to form the inter-layer insulating layer 128 having a sufficient film thickness on the etching residue 125B. Therefore, a leakage current I3 flows between the first interconnection 130 and the columnar structure 35 as the etching residue 125B in some cases.

On the grounds described above, in the related-art light emitting device 120, due to the effect of the leakage currents I1, I2, and I3, there is a possibility that there arises a problem that it becomes difficult for the predetermined current to flow through the light emitting sections 126, and thus, it is unachievable to obtain the predetermined amount of light emitted, or unwanted light emission occurs in a place other than the light emitting sections 126.

To cope with this problem, in the case of the light emitting device 20 according to the present embodiment, as shown in FIG. 2, since the first columnar structure groups 25 and the second columnar structure group 27 are continuously disposed on the semiconductor layer 24, the end portion of the columnar structure group does not exist in the vicinity of the light emitting section 26, and no step occurs between the light emitting sections 26 and the regions other than the light emitting sections 26. Therefore, no step occurs in the inter-layer insulating layer 28, and the upper surface of the inter-layer insulating layer 28 is made flat. Thus, in the light emitting device 20 according to the present embodiment, such leakage currents as in the related-art light emitting device 120 can be prevented from occurring, and it is possible to prevent the occurrence of the problem such as a problem that the predetermined amount of light emitted in the light emitting section 26 cannot be obtained, a problem that unwanted light emission occurs in a region other than the light emitting section 26, and a problem that there is a possibility that the broken line of the first interconnection 301 occurs.

Further, in the light emitting device 20 according to the present embodiment, the light emitting sections 26 each include the first light emitting section 261, the second light emitting section 262, the third light emitting section 263, and the fourth light emitting section 264, and the second columnar structure group 27 is disposed in the region located between the two light emitting sections adjacent to each other on the substrate 23 in the plan view viewed from the Z-axis direction. According to this configuration, since the second columnar structure group 27 is constituted by the plurality of columnar structures 35 and the insulator 38 which covers the periphery of each of the columnar structures 35, it is possible to separate the two light emitting sections 26 adjacent to each other so as to be insulated from each other, and thus, it is possible to drive the light emitting sections 26 independently of each other.

Further, in the light emitting device 20 according to the present embodiment, the distance between the columnar structures 35 adjacent to each other in the first columnar structure groups 25 and the distance between the columnar structures 35 adjacent to each other in the second columnar structure group 27 are equal to each other. Further, the size of the columnar structure 35 of the first columnar structure groups 25 and the size of the columnar structure 35 of the second columnar structure group 27 are equal to each other. According to this configuration, since it is possible to form the first columnar structure groups 25 and the second columnar structure group 27 in one process at the same time, there is no chance for the manufacturing process to become complicated.

Further, in the light emitting device 20 according to the present embodiment, the second electrode terminal 31 fails to overlap the first columnar structure group 25 or the second columnar structure group 27 in the plan view viewed from the Z-axis direction. According to this configuration, it is possible to surely achieve the electrical coupling between the second electrode terminal 31 and the semiconductor layer 24.

Second Embodiment

A second embodiment of the present disclosure will hereinafter be described using FIG. 5 through FIG. 7.

A light emitting device according to the second embodiment is substantially the same in basic configuration as that of the first embodiment, but is different in the configuration of the second columnar structure group from that of the first embodiment. Therefore, the description of the basic configuration of the light emitting device will be omitted.

Figure 5:
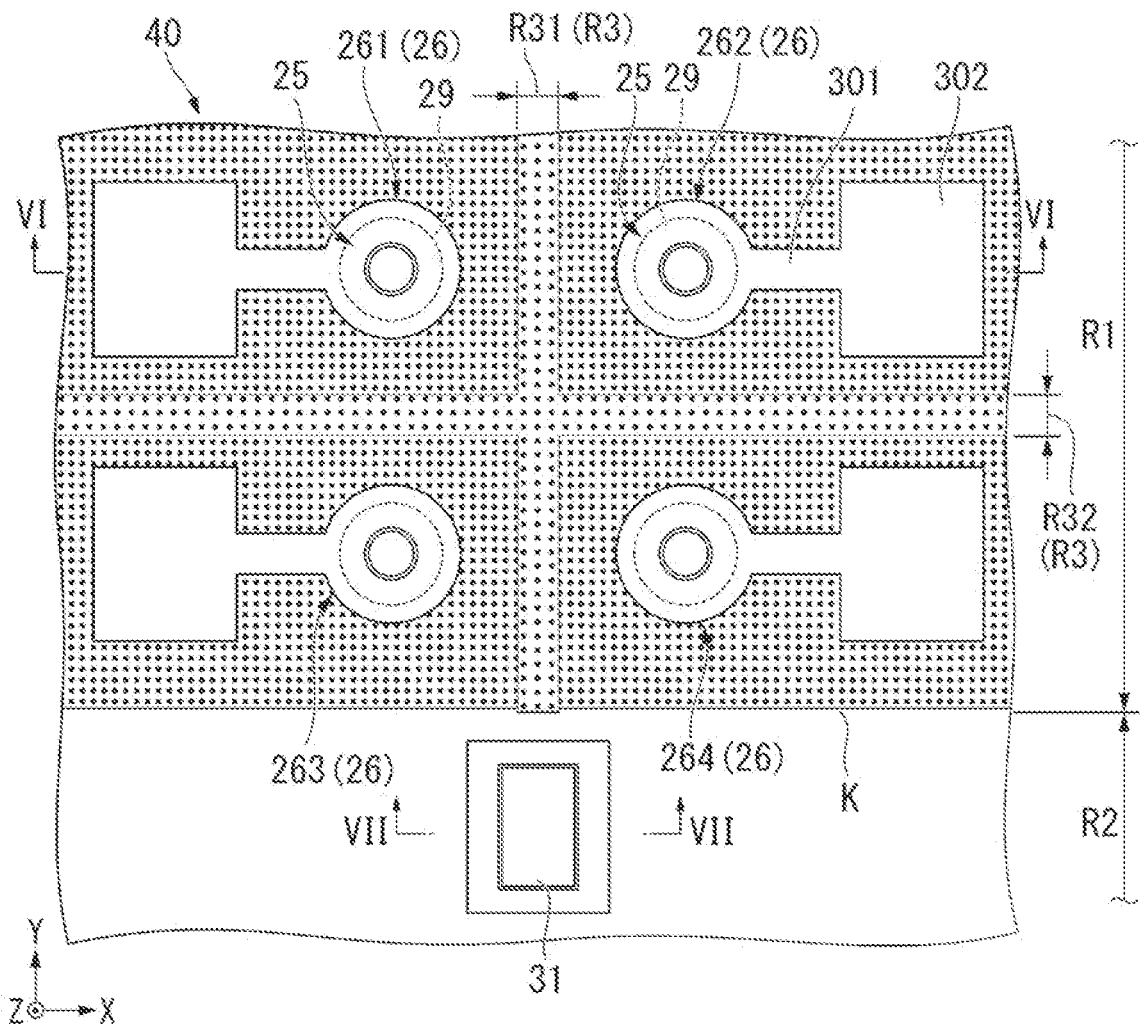
FIG. 5 is a plan view of a light emitting device according to a second embodiment.

FIG. 5 is a plan view of the light emitting device 40 according to the second embodiment. FIG. 6 is a cross-sectional view of the light emitting device 40 along the line VI-VI shown in FIG. 5. FIG. 7 is a cross-sectional view of the light emitting device 40 along the line VII-VII shown in FIG. 5.

Figure 6:
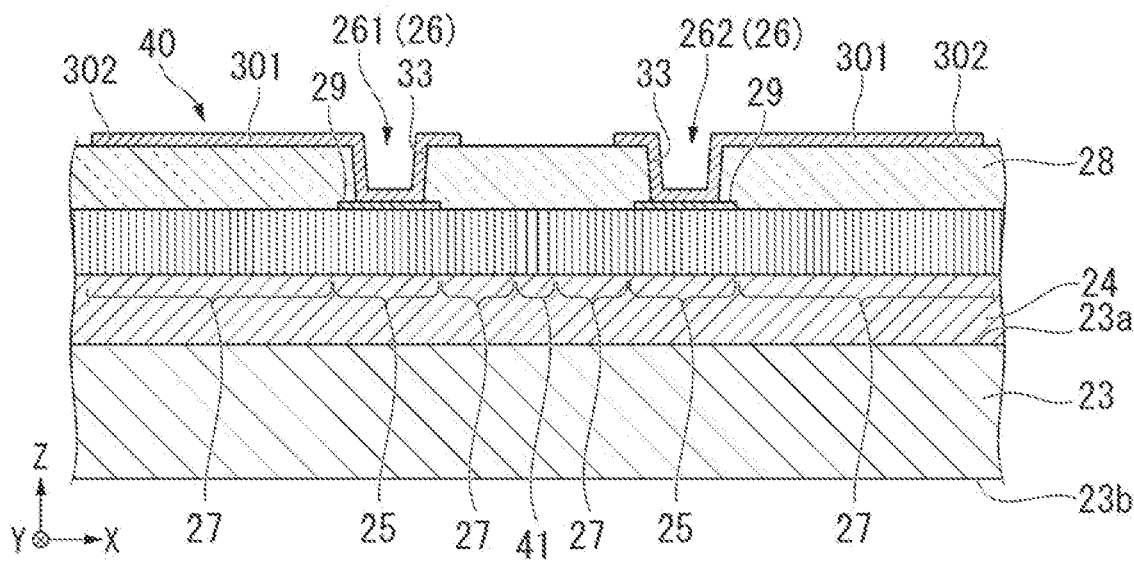
FIG. 6 is a cross-sectional view of the light emitting device along the line VI-VI shown in FIG. 5.
Figure 7:
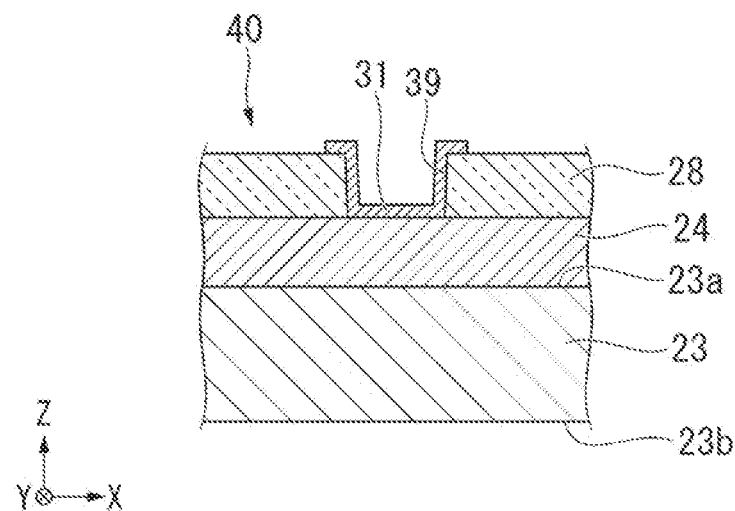
FIG. 7 is a cross-sectional view of the light emitting device along the line VII-VII shown in FIG. 5.

In FIG. 5 through FIG. 7, the constituents common to the drawings used in the first embodiment are denoted by the same reference symbols, and the description thereof will be omitted.

As shown in FIG. 5 through FIG. 7, the light emitting device 40 according to the present embodiment is provided with the substrate 23, the semiconductor layer 24, the light emitting sections 26 each having the first columnar structure group 25, second columnar structure groups 27, 41, the inter-layer insulating layer 28, the first electrodes 29, the first interconnections 301, the first electrode terminals 302, and the second electrode terminal 31.

The light emitting device 20 according to the first embodiment has the configuration in which the distance between the columnar structures 35 adjacent to each other in the first columnar structure groups 25 and the distance between the columnar structures 35 adjacent to each other in the second columnar structure group 27 are equal to each other. In contrast, in the light emitting device 40 according to the present embodiment, the distance between the columnar structures 35 adjacent to each other in the second columnar structure group 41 in a region R3 located between the two light emitting sections 26 adjacent to each other on the substrate 23 out of the second columnar structure groups 27, 41 is longer than the distance between the columnar structures adjacent to each other in the first columnar structure groups 25.

More specifically, as shown in FIG. 5, the distance between the columnar structures 35 adjacent to each other in the second columnar structure group 41 disposed in the area R3 obtained by combining a region R31 extending along the Y axis and located between the two light emitting sections 26 adjacent in the X-axis direction to each other in the region other than the plurality of light emitting sections 26, and a region R32 extending along the X axis and located between the two light emitting sections 26 adjacent in the Y-axis direction to each other in the region other than the plurality of light emitting sections 26 is longer than the distance between the columnar structures 35 adjacent to each other in the first columnar structure groups 25. In other words, the density of the columnar structures 35 in the second columnar structure group 41 in the region R3 described above is lower than the density of the columnar structures 35 in the first columnar structure groups 25. It should be noted that the density of the columnar structures 35 is defined as the number of columnar structures 35 per unit area. In other words, in the case of the present embodiment, each of the light emitting sections 26 is zoned by the second columnar structure group 41 lower in density of the columnar structures 35 than the first columnar structure groups 25.

The rest of the configuration of the light emitting device 40 is substantially the same as the configuration of the light emitting device 20 according to the first embodiment.

Also in the light emitting device 40 according to the present embodiment, the leakage current can be prevented from occurring, and it is possible to obtain substantially the same advantage as in the first embodiment such as an advantage that it is possible to prevent the occurrence of the problems such as a problem that the predetermined amount of light emitted cannot be obtained, a problem that unwanted light emission occurs in a region other than the light emitting section 26, and a problem that there is a possibility that the broken line of the first interconnection 301 occurs.

When the distance between the columnar structures constituting the second columnar structure group is short, it is conceivable when the columnar structures adjacent to each other make contact with each other despite the fact that the periphery of each of the columnar structures is surrounded by the insulator. In this case, there is a possibility that the separation and the insulation between the light emitting sections becomes insufficient. To cope with this problem, in the light emitting device 40 according to the present embodiment, since the distance between the columnar structures 35 in the second columnar structure group 41 in the region R3 located between the light emitting sections 26 adjacent to each other is longer than the distance between the columnar structures 35 in the first columnar structure groups 25, the possibility that columnar structures 35 adjacent to each other make contact with each other is low, and it is possible to more surely insulate and separate the light emitting sections 26 from each other.

It should be noted that in the present embodiment, there is adopted the configuration in which the distance between the columnar structures 35 adjacent to each other in the second columnar structure group 41 is longer than the distance between the columnar structures 35 adjacent to each other in the first columnar structure groups 25 in a specific region located between the light emitting sections 26 adjacent to each other in the region other than the light emitting sections 26. Instead of this configuration, it is possible to adopt a configuration in which the distance between the columnar structures 35 adjacent to each other in the second columnar structure group in the entire region other than the light emitting sections 26 is longer than the distance between the columnar structures 35 adjacent to each other in the first columnar structure groups 25.

Third Embodiment

A third embodiment of the present disclosure will hereinafter be described using FIG. 8.

Figure 8:
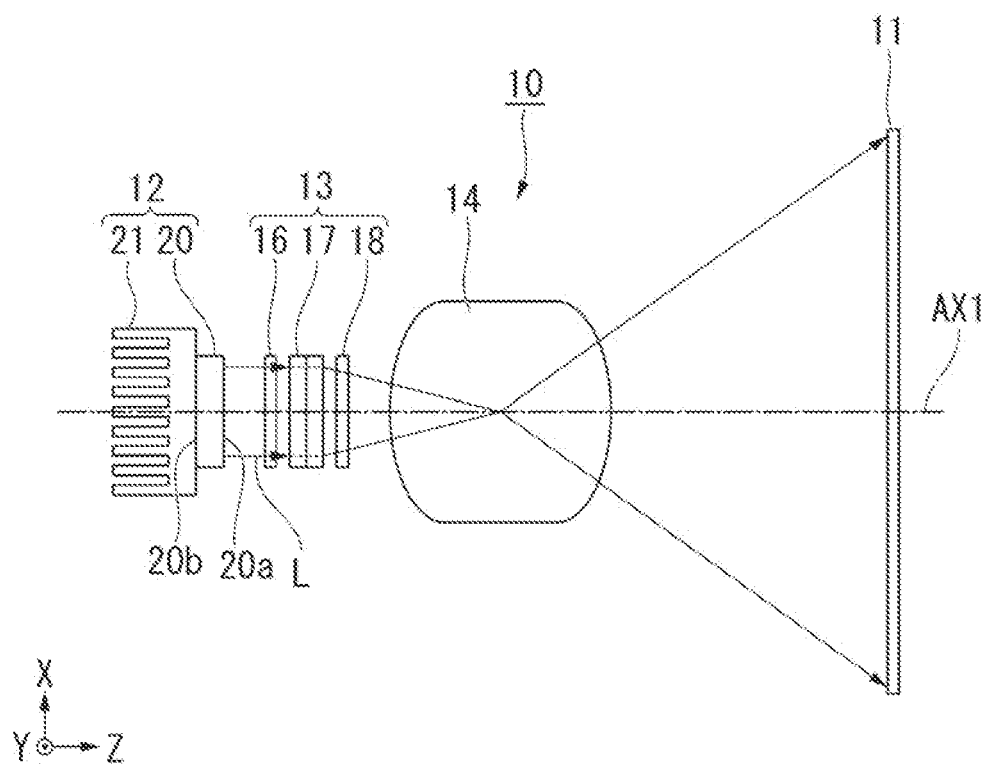
FIG. 8 is a schematic configuration diagram of a projector according to a third embodiment.

FIG. 8 is a schematic configuration diagram of a projector 10 according to the present embodiment.

As shown in FIG. 8, the projector 10 according to the present embodiment is a projection-type image display device for projecting an image on a screen 11. The projector is provided with a light source device 12, a light modulation device 13, and a projection optical device 14.

The light source device 12 is provided with the light emitting device 20 and a heatsink 21. The light emitting device 20 has a first surface 20a and a second surface 20b, and emits a light beam L from the first surface 20a. The heatsink 21 radiates the heat generated in the light emitting device 20, and is therefore disposed on the second surface 20b of the light emitting device 20. As the light emitting device 20, there is used the light emitting device 20 according to the first embodiment, but it is possible to use the light emitting device 40 according to the second embodiment.

An optical axis AX1 in FIG. 8 is an axis on which the principal ray of the light beam L emitted from the light emitting device 20 passes. The optical axis AX1 is parallel to the Z axis used in the explanation of the first embodiment and the second embodiment.

The light modulation device 13 modulates the light beam L emitted from the light source device 12 in accordance with the image information to generate image light. The light modulation device 13 has an incident side polarization plate 16, a liquid crystal display element 17, and an exit side polarization plate 18. When viewed from the Z-axis direction, the planar shape of an image formation region of the liquid crystal display element 17 is a rectangular shape. Further, the planar shape of the light emitting region of the light emitting device 20 is a rectangular shape, and the planar shape of the image formation region and the planar shape of the light emitting region are substantially similar to each other. The area of the light emitting region is the same as the area of the image formation region, or is slightly larger than the area of the image formation region.

The projection optical device 14 projects the image light emitted from the light modulation device 13 on a projection target surface such as the screen 11. The projection optical device 14 is formed of a single projection lens or a plurality of projection lenses.

The projector 10 according to the present embodiment is provided with the light emitting device 20 according to the first embodiment or the light emitting device 40 according to the second embodiment as the light emitting device 20, and is therefore excellent in display quality, and at the same time, excellent in reliability.

It should be noted that the scope of the present disclosure is not limited to the embodiments described above, but a variety of modifications can be provided thereto within the scope or the spirit of the present disclosure.

For example, although the light emitting layer made of the InGaN series material is described in the above embodiments, it is possible to use a variety of semiconductor materials in accordance with the wavelength of the light to be emitted as the light emitting layer. It is possible to use semiconductor materials of, for example, an AlGaN series, an AlGaAs series, an InGaAs series, an InGaAsP series, an InP series, a GaP series, or an AlGaP series. Further, it is also possible to change the diametrical size or the pitch of the columnar structures in accordance with the wavelength of the light to be emitted.

Besides the above, the specific descriptions of the shape, the number, the arrangement, the material, and so on of the constituents of the light emitting device and the projector are not limited to those in the embodiments described above, but can arbitrarily be modified. Although in the embodiments described above, there is described the example of installing the light emitting device according to the present disclosure in the projector using a transmissive liquid crystal display element as the light modulation device, the example is not a limitation. The light emitting device according to the present disclosure can also be installed in the projector using a reflective liquid crystal display element or a digital micromirror device as the light modulation device. Alternatively, it is possible to use the light emitting device according to the present disclosure as a display element of the projector.

Although in the embodiments described above, there is described the example of installing the light emitting device according to the present disclosure in the projector, the example is not a limitation. The light emitting device according to the present disclosure can also be applied to a light emitting element of a μLED (micro-Light Emitting Diode) display having microscopic light emitting elements disposed in an array to perform image display. Further, the light emitting device according to the present disclosure can also be applied to lighting equipment, a headlight of a vehicle, and so on.

A light emitting device according to an aspect of the present disclosure may have the following configuration.

The light emitting device according to an aspect of the present disclosure includes a substrate, and a columnar structure group formed of a plurality of columnar structures disposed on the substrate, wherein the plurality of columnar structures includes a plurality of first columnar structures disposed in a light emitting section, and a plurality of second columnar structures disposed in a region other than the light emitting section on the substrate, the columnar structure group includes a first columnar structure group including the plurality of first columnar structures, and a light propagation layer disposed between the first columnar structures, and a second columnar structure group including the plurality of second columnar structures, and an insulating layer disposed between the second columnar structures, an inter-layer insulating layer which is configured to cover the first columnar structure group and the second columnar structure group is disposed on the substrate, a conductive layer to be electrically coupled to the first columnar structure group via a contact hole provided to the inter-layer insulating layer is disposed on the inter-layer insulating layer, a first electrode terminal electrically coupled to the conductive layer is disposed on the inter-layer insulating layer, the first columnar structures are formed of a first semiconductor layer having a first conductivity type disposed on the substrate, a second semiconductor layer having a second conductivity type different from the first conductivity type, and a light emitting layer disposed between the first semiconductor layer and the second semiconductor layer, the conductive layer is electrically coupled to the second semiconductor layer, and when viewed from a normal direction of the substrate, the conductive layer and the first electrode terminal overlap the second columnar structure group.

In the light emitting device according to the aspect of the present disclosure, the light emitting section may have a first light emitting section and a second light emitting section disposed at a position at a distance from the first light emitting section on the substrate, and when viewed from the normal direction of the substrate, the second columnar structure group may be disposed in a region located between the first light emitting section and the second light emitting section on the substrate.

In the light emitting device according to the aspect of the present disclosure, a distance between the first columnar structures adjacent to each other in the first columnar structure group and a distance between the second columnar structures adjacent to each other in the second columnar structure group may be equal to each other.

In the light emitting device according to the aspect of the present disclosure, a distance between the second columnar structures adjacent to each other in the second columnar structure group at least in a region located between the first light emitting section and the second light emitting section on the substrate out of the second columnar structure group may be longer than a distance between the first columnar structures adjacent to each other in the first columnar structure group.

In the light emitting device according to the aspect of the present disclosure, there may further be included a second electrode terminal which is disposed on the inter-layer insulating layer, and which is electrically coupled to the first semiconductor layer of the first columnar structures in the first columnar structure group via a contact hole provided to the inter-layer insulating layer, wherein when viewed from the normal direction of the substrate, the second electrode terminal may overlap neither the first columnar structure group nor the second columnar structure group.

The projector according to an aspect of the present disclosure includes the light emitting device according to the aspect of the present disclosure, and a projection optical device configured to project the light emitted from the light emitting device.

What is claimed is:

1. A light emitting device comprising:
   a substrate; and
   a columnar structure group formed of a plurality of columnar structures disposed on the substrate, wherein
   the plurality of columnar structures includes:
      a plurality of first columnar structures disposed in a light emitting section on the substrate, two adjacent first columnar structures of the plurality of first columnar structures sandwiching a first intermediate columnar structure, the first intermediate columnar structure being configured with a first bottom part and a first remaining part, a mask layer being provided at the first bottom part, a light propagating layer being provided at the first remaining part; and
      a plurality of second columnar structures disposed in a region other than the light emitting section on the substrate, two adjacent second columnar structures of the plurality of second columnar structures sandwiching a second intermediate columnar structure, the second intermediate columnar structure being configured with a second bottom part and a second remaining part, the mask layer being provided at the second bottom part, an insulating layer being provided at the second remaining part,
   the columnar structure group includes:

a first columnar structure group including the plurality of first columnar structures and a plurality of the first intermediate columnar structures; and
a second columnar structure group including the plurality of second columnar structures and a plurality of the second intermediate columnar structures,
the light emitting device further includes:
an inter-layer insulating layer covering the first columnar structure group and the second columnar structure group, the inter-layer insulating layer being disposed on the substrate;
a conductive layer electrically coupled to only the first columnar structure group, without being electrically coupled to the second columnar structure group, via a contact hole provided in the inter-layer insulating layer, the conductive layer being disposed on the inter-layer insulating layer and the contact hole; and
a first electrode terminal electrically coupled to the conductive layer, the first electrode terminal being disposed on the inter-layer insulating layer,
each of the plurality of first columnar structures is formed of a first semiconductor layer having a first conductivity type disposed on the substrate, a second semiconductor layer having a second conductivity type different from the first conductivity type, and a light emitting layer disposed between the first semiconductor layer and the second semiconductor layer,
the conductive layer is electrically coupled to the second semiconductor layer of only the first columnar structure group,
the conductive layer and the first electrode terminal partially overlap the second columnar structure group via the inter-layer insulating layer in a plan view, and
an outer periphery of the first columnar structure group is directly surrounded by an inner periphery of the second columnar structure group such that the plurality of first columnar structures and the plurality of second columnar structures are arranged directly adjacent to each other without having a gap therebetween.

2. The light emitting device according to claim 1, wherein the light emitting section has a first light emitting section and a second light emitting section, and the second light emitting section is disposed at a position at a distance from the first light emitting section on the substrate, and
the second columnar structure group is disposed in a region located between the first light emitting section and the second light emitting section on the substrate in the plan view.

3. The light emitting device according to claim 2, wherein a distance between two adjacent second columnar structures of the plurality of second columnar structures in the second columnar structure group at least in a region located between the first light emitting section and the second light emitting section on the substrate is larger than a distance between two adjacent first columnar structures of the plurality of first columnar structures in the first columnar structure group.

4. The light emitting device according to claim 1, wherein a distance between two adjacent first columnar structures of the plurality of first columnar structures in the first columnar structure group and a distance between two adjacent second columnar structures of the plurality of second columnar structures in the second columnar structure group are equal to each other.

5. The light emitting device according to claim 1, further comprising:

a second electrode terminal which is disposed on the inter-layer insulating layer, and which is electrically coupled to the first semiconductor layer of the plurality of first columnar structures in the first columnar structure group via another contact hole provided in the inter-layer insulating layer, wherein
the second electrode terminal overlaps neither the first columnar structure group nor the second columnar structure group in the plan view.

6. A projector comprising:
the light emitting device according to claim 1; and
a projection optical device configured to project light emitted from the light emitting device.

7. A light emitting device comprising:
a substrate;
a wiring substrate;
a columnar structure group formed of a plurality of columnar structures disposed on the substrate, wherein
the plurality of columnar structures includes:
a plurality of first columnar structures disposed in a light emitting section; and
a plurality of second columnar structures disposed in a region which fails to overlap the light emitting section in a plan view,
the columnar structure group includes:
a first columnar structure group including the plurality of first columnar structures, and a light propagation layer disposed between two first columnar structures of the plurality of first columnar structures; and
a second columnar structure group including the plurality of second columnar structures, and an insulating layer disposed between two second columnar structures of the plurality of second columnar structures,
an inter-layer insulating layer which is configured to cover the first columnar structure group and the second columnar structure group,
a conductive layer to be electrically coupled to only the first columnar structure group, without being electrically coupled to the second columnar structure group, via a contact hole provided to the inter-layer insulating layer is disposed on the inter-layer insulating layer,
a first electrode terminal electrically coupled to the conductive layer is disposed on the inter-layer insulating layer, and the first electrode terminal is an electrode pad,
the conductive layer is electrically coupled to the wiring substrate via the first electrode terminal,
each of the plurality of first columnar structures is formed of a first semiconductor layer having a first conductivity type disposed on the substrate, a second semiconductor layer having a second conductivity type different from the first conductivity type, and a light emitting layer disposed between the first semiconductor layer and the second semiconductor layer,
the conductive layer is electrically coupled to the second semiconductor layer of only the first columnar structure group, and
the conductive layer and the first electrode terminal overlap the second columnar structure group via the inter-layer insulating layer in the plan view.

8. The light emitting device according to claim 7, wherein the first electrode terminal is electrically coupled to the wiring substrate via a bonding wire or a bump.

* * * * *